(12) United States Patent
Levy et al.

(10) Patent No.: US 11,792,107 B2
(45) Date of Patent: Oct. 17, 2023

(54) RESILIENT ROUTING SYSTEMS AND METHODS FOR HOSTED APPLICATIONS

(71) Applicant: AMADEUS S.A.S., Biot (FR)

(72) Inventors: Daniel Camille Bernard Levy, Biot (FR); Julien Delacroix, Valbonne (FR); Nicolas Wendling, Mougins (FR); Paul Gracia, Vallauris (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 17/330,731

(22) Filed: May 26, 2021

(65) Prior Publication Data

US 2022/0385562 A1    Dec. 1, 2022

(51) Int. Cl.
*H04L 45/02*      (2022.01)
*H04L 45/302*    (2022.01)
*H04L 45/42*      (2022.01)

(52) U.S. Cl.
CPC .............. *H04L 45/04* (2013.01); *H04L 45/02* (2013.01); *H04L 45/306* (2013.01); *H04L 45/42* (2013.01)

(58) Field of Classification Search
CPC ....... H04L 45/02; H04L 45/306; H04L 45/42; H04L 45/04
See application file for complete search history.

(56) References Cited

U.S. PATENT DOCUMENTS

| | | | | |
|---|---|---|---|---|
| 2003/0108036 A1* | 6/2003 | Henry | .................. | H04W 8/082 370/356 |
| 2006/0195607 A1* | 8/2006 | Naseh | ................. | H04L 67/1008 709/238 |
| 2007/0038764 A1* | 2/2007 | Maillard | ........... | H04M 1/72403 709/229 |
| 2009/0168787 A1* | 7/2009 | Ansari | .................... | H04L 12/66 370/401 |
| 2010/0235431 A1* | 9/2010 | Poluri | ................. | G06F 11/2066 709/203 |
| 2013/0332586 A1* | 12/2013 | Masputra | .............. | H04L 69/167 709/220 |
| 2014/0097966 A1* | 4/2014 | Alexander | ............. | G01D 4/002 340/870.02 |

(Continued)

FOREIGN PATENT DOCUMENTS

CN            110943925 A        3/2020

*Primary Examiner* — Mohamed A. Wasel
*Assistant Examiner* — Jihad K Boustany
(74) *Attorney, Agent, or Firm* — Perry + Currier

(57) ABSTRACT

In a system including a plurality of computing subsystems executing a set of hosted applications, each of the computing subsystems maintains a copy of a common routing matrix defining, for each hosted application, an identifier of a computing subsystem configured to host the application. A first intra-subsystem routing component of a first one of the computing subsystems receives a message; determines a target one of the hosted applications to process the message; identifies, according to the common routing matrix, a second one of the computing subsystems that executes the target hosted application; and in response to the identifying, provides the message and a routing indicator to a first inter-subsystem routing component of the first computing subsystem. The first inter-subsystem routing component the transmits the message to the second computing subsystem.

24 Claims, 6 Drawing Sheets

(56) References Cited

U.S. PATENT DOCUMENTS

| | | | |
|---|---|---|---|
| 2014/0177639 A1* | 6/2014 | Vershkov | H04L 45/58 370/401 |
| 2014/0334488 A1 | 11/2014 | Guichard et al. | |
| 2016/0065536 A1* | 3/2016 | Aoshima | H04L 61/2514 370/392 |
| 2018/0212881 A1* | 7/2018 | White | H04L 43/20 |
| 2020/0125453 A1* | 4/2020 | Kommera | G06F 11/1662 |
| 2022/0311707 A1* | 9/2022 | Patel | H04L 45/586 |

\* cited by examiner

RESILIENT ROUTING SYSTEMS AND METHODS FOR HOSTED APPLICATIONS

FIELD

The specification relates generally to hosted computing applications, and specifically to resilient routing methods and systems for such hosted applications.

BACKGROUND

Cloud-based applications may be deployed across a number of computing subsystems, e.g. to provide geographic distribution, backup capabilities in the case of outages, and the like. In systems involving multiple hosted applications configured to interact with one another, however, reconfiguring a system to resiliently switch to a backup version of an application may be a complex, time-consuming, and error-prone process.

SUMMARY

An aspect of the specification provides a method in a system including a plurality of computing subsystems executing a set of hosted applications, the method comprising: at each of the computing subsystems, maintaining a copy of a common routing matrix defining, for each hosted application, an identifier of a computing subsystem configured to host the application; at a first intra-subsystem routing component of a first one of the computing subsystems, receiving a message; determining, at the first intra-subsystem routing component, a target one of the hosted applications to process the message; identifying, according to the common routing matrix, a second one of the computing subsystems that executes the target hosted application; in response to the identifying, providing the message and a routing indicator to a first inter-subsystem routing component of the first computing subsystem; at the first inter-subsystem routing component, transmitting the message to the second computing subsystem.

Another aspect of the specification provides a computing subsystem among a plurality of computing systems executing a set of hosted applications system, the computing subsystem comprising: a memory maintaining a copy of a common routing matrix defining, for each hosted application, an identifier of one of the plurality of computing subsystems configured to host the application; a first intra-subsystem routing component configured to: receive a message, determine a target one of the hosted applications to process the message, identify, according to the common routing matrix, a second one of the computing subsystems that executes the target hosted application, in response to the identification, provide the message and a routing indicator to a first inter-subsystem routing component of the first computing subsystem; and the first inter-subsystem routing component configured to transmit the message to the second computing subsystem.

BRIEF DESCRIPTIONS OF THE DRAWINGS

Embodiments are described with reference to the following figures.

DETAILED DESCRIPTION

Figure 1:
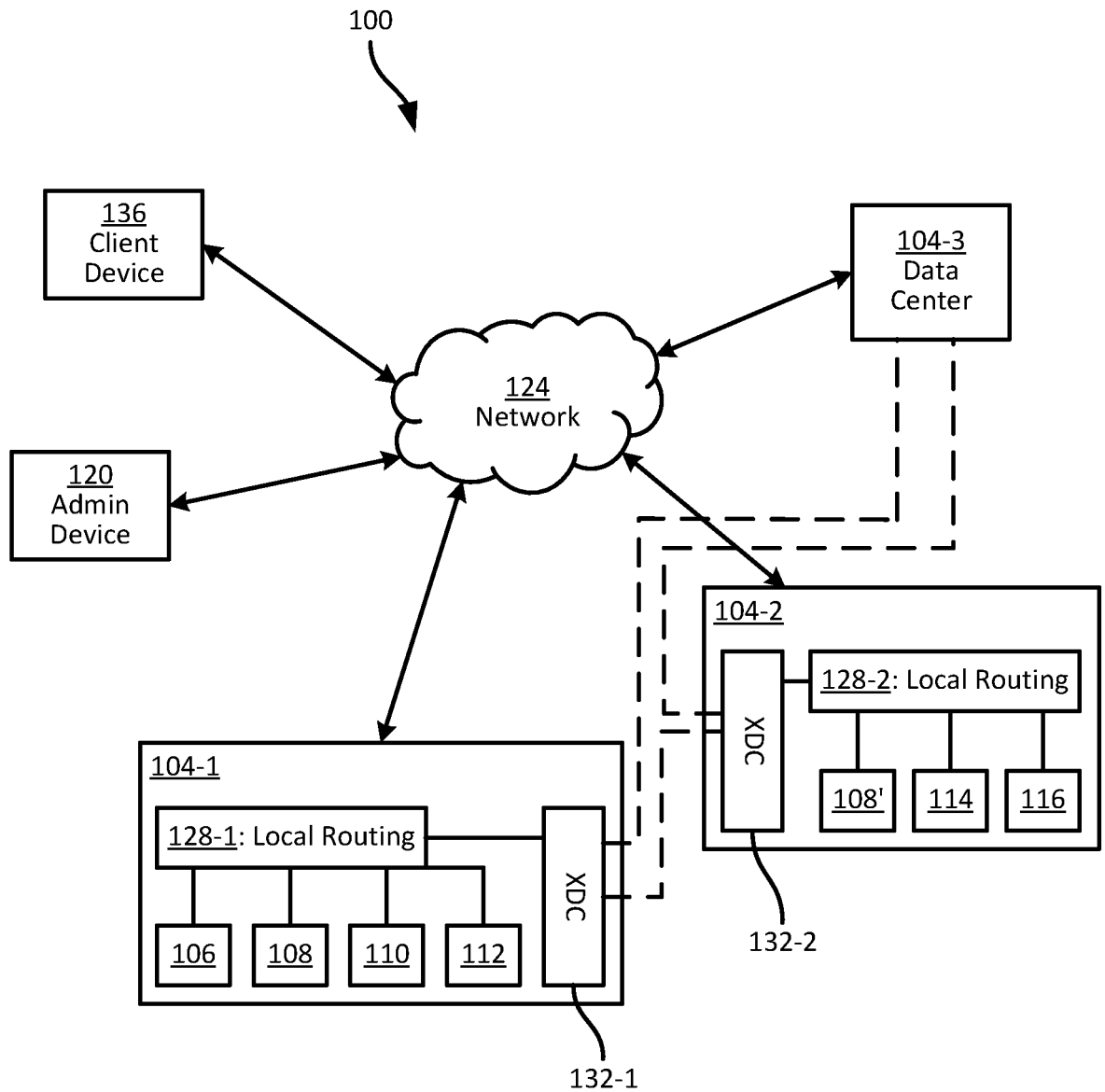
FIG. 1 is a diagram of a system for message routing in a distributed computing system.

FIG. 1 illustrates a system 100, including a plurality of computing subsystems 104, of which three examples 104-1, 104-2, and 104-3 are illustrated. The system 100 can include as few as two subsystems 104, and any suitable number of subsystems 104 greater than three, e.g. depending on the scale and/or geographic distribution of the system 100.

Each computing subsystem 104, which is also referred to herein as a data center 104, includes at least one computing device. For instance, each data center 104 can include a plurality of computing devices, e.g. co-located and operated by an information technology infrastructure provider, or the like. Each data center 104 can execute a set of hosted applications (including as few as one hosted application). For example, the data center 104-1 executes the hosted applications 106, 108, 110, and 112. The data center 104-2 executes the hosted applications 114 and 116, as well as a standby instance of the application 108, labelled as a hosted application 108'. The hosted application 108' may be periodically synchronized with the hosted application 108, e.g. as a backup in the event that the hosted application 108 suffers an outage, performance degradation, or the like. That is, requests or other tasks that are relevant to the hosted applications 108/108' are handled by the hosted application 108, and the hosted application 108' remains idle. However, under some conditions, the hosted application 108' may be reconfigured as the active instance and begin handling requests.

Although internal components of the data center 104-3 are not illustrated in FIG. 1 for simplicity, it will be understood that the data center 104-3 also executes a set of hosted applications, which can include any combination of applications distinct from those executed by the data centers 104-1 and 104-2, and/or standby instances of the hosted applications 106 to 116.

The allocation of specific hardware resources to specific hosted applications within a given data center 104 is beyond the scope of the present discussion. In general, it will be apparent that each data center 104 implements hardware-allocation functionality, and maintains a current view of which hardware elements execute which host applications.

The hosted applications themselves can implement a wide variety of functionality, the nature of which has no direct impact on the operation of the system 100 for the purposes of this discussion. For example, the system 100 can be operated to implement functionality such as flight reservations, inventory management, passenger check-in, ticketing, and the like. Each of the above functions can be implemented as a distinct hosted application. By way of a specific example, the hosted applications 106, 108 (and therefore 108'), 110, and 114 are assumed in the discussion below to implement departure control functionality (also referred to as a departure control system, or DOS) for respective airlines. The hosted application 112, meanwhile, is assumed herein to implement a flight reservation engine employed by each of the hosted applications 106, 108, 110, and 114. The hosted application 116 is assumed to implement border control functionality, e.g. for a specific country or other form of jurisdiction. In other examples, as will be apparent in the discussion below, the hosted applications can implement functionality unrelated to air travel.

As will be apparent, the hosted applications can therefore be dependent on each other to at least a degree. Some hosted applications can therefore be required to communicate with hosted applications at a different data center 104. Further, in the event of a hardware failure or other condition affecting a data center 104 or a specific hosted application at a data center 104, the functionality implemented by that hosted application can be migrated to another data center 104, as mentioned above in connection with the hosted applications 108 and 108'. The above scenarios both involve communication between distinct data centers 104, and may also involve reconfiguring the parameters affecting such communication.

For example, in the event of a failure or impending failure at the hosted application 108, an administrator of the system 100 can, e.g. via an administrator computing device 120 connected to the data centers 104 via a network 124 (e.g. any suitable combination of wide and/or local-area networks), issue commands to the data centers 104-1 and 104-2 to activate the hosted application 108'. However, in some systems the administrator is also required to reconfigure the individual applications 108/108' themselves, and/or other applications that rely on the application 108. In other words, activating a standby instance of an application such as the hosted application 108 can be sufficiently complex to become a time-consuming and error-prone process, which may therefore negatively impact the operations of the data centers 104.

To mitigate the complexity of the above-mentioned reconfiguration, each data center 104 also includes routing components, e.g. implemented as additional applications executed by one or more computing devices of the data center 104. In particular, as shown in FIG. 1. each data center 104 includes an intra-subsystem routing component 128-1, 128-2, which is also referred to as a local routing component 128 herein. In addition, each data center 104 includes an inter-subsystem routing component 132-1, 132-2, also referred to herein as a cross-data center (XDC) routing component.

As will be discussed in greater detail below, the local routing components 128 are configured to handle a task such as an incoming request, e.g. received from a client device 136 (e.g. operated by a travel agent or traveler, in the example discussed herein), by identifying which hosted application is configured to process the task. Having made such an identification, the relevant local routing component 128 is configured to determine a location for the hosted application. In particular, each data center 104 (and specifically, and local routing component 128) maintains a copy of a shared routing matrix that indicates which data center 104 hosts the active instance of each hosted application. The local routing component 128 can then either provide the request to a local (i.e. at the same data center as the local routing component 128) hosted application, or send the request to another data center 104, via the corresponding XDC routing component 132.

Each XDC routing component 132 is configured to maintain a connection with each other XDC routing component 132, as illustrated in dashed lines in FIG. 1. Upon receiving a message from another data center 104, the XDC routing component passes the message to the local routing component 128 for handling (e.g. via provision to the appropriate hosted application).

As will be apparent in the discussion below, the deployment of the routing components 128 and 132 as a layer between the hosted applications of a given data center 104 and the other data centers 104 enables routing of tasks between data centers 104 to be implemented with little or no modification to the hosted applications themselves, as the hosted applications are not responsible for establishing the parameters required for direct communication with other hosted applications. Further, the use of the common routing matrix mentioned above enables modifications to active instances of hosted applications, e.g. by the administrator device 120, with minimal configuration changes. In particular, in some examples, the routing matrix itself is the only configuration data that is edited in order to switch activity from the hosted application 108 to the hosted application 108'.

Figure 2:
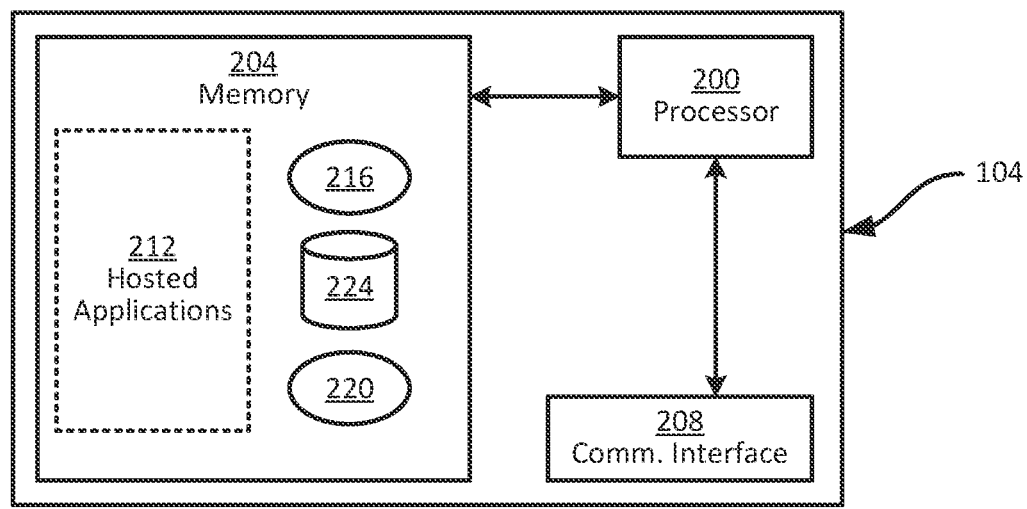
FIG. 2 is a diagram of certain internal components of the primary server of FIG.

Before discussing the operation of the system 100, and particularly the data centers 104, in greater detail, certain internal components of the data centers 104 will be described in greater detail, with reference to FIG. 2. FIG. 2 illustrates such components for a generic data center 104, and it will therefore be understood that each of the data centers 104-1, 104-2, and 104-3 shown in FIG. 1 includes the components shown in FIG. 2. However, the data centers 104 of FIG. 1 need not include exactly the same configuration of such components. At a minimum, as noted earlier, the set of hosted applications at each data center 104 may differ.

As shown in FIG. 2, the data center 104 includes at least one processor 200, such as a central processing unit (CPU) or the like. The processor 200 is interconnected with a memory 204, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 200 and the memory 204 are generally comprised of one or more integrated circuits (ICs).

The processor 200 is also interconnected with a communications interface 208, which enables the data center 104 to communicate with the other computing devices and subsystems of the system 100 via the network 124. The communications interface 208 therefore includes any necessary components (e.g. network interface controllers (NICs), radio units, and the like) to communicate via the network 124. The specific components of the communications interface 208 are selected based on upon the nature of the network 124.

The memory 204 stores a plurality of computer-readable programming instructions, executable by the processor 200, in the form of various applications. As will be understood by those skilled in the art, the processor 200 executes the instructions of those applications in order to perform various actions defined by the instructions contained therein. In the description below, the processor 200, and more generally the data center 104, are said to be configured to perform those actions. It will be understood that they are so configured via the execution (by the processor 200) of the instructions of the applications stored in memory 204.

The applications stored in the memory 204 include a set 212 of hosted applications. As mentioned earlier, the content of the set 212 can vary between data centers 104. For example, for the data center 104-1, the set 212 includes the applications 106, 108, 110, and 112. The applications stored in the memory 204 also include a intra-subsystem routing application 216 whose execution implements the local routing component 128 mentioned in connection with FIG. 1. The applications stored in the memory 204 further include an inter-subsystem routing application 220 whose execution implements the XDC routing component 132 mentioned in connection with FIG. 1.

The memory 204 also stores a routing matrix 224. As noted above, the routing matrix 224 is common to all data centers 104. For example, the copies of the routing matrix 224 stored by each data center 104 can be periodically synchronized, and/or updates to the routing matrix, e.g. from the administrator device 120, can be propagated to every data center 104.

As noted above, each data center 104 can include a plurality of physical computing devices, which can be connected to one another by local communications hardware, control components, and the like. Therefore, although the data center 104 is shown as a single computing device in FIG. 2, in practice the data center 104 often includes multiple computing devices. For instance, each hosted application in the set 212 can be deployed on a respective computing device.

As will be apparent in the discussion below, the applications 216 and 220 can be implemented as a single application in some examples, but are shown as separate applications for illustrative purposes. In other examples, the functionality of any one or more of the applications 216 and 220 can be implemented using pre-programmed hardware or firmware elements (e.g., application specific integrated circuits (ASICs), electrically erasable programmable read-only memories (EEPROMs), etc.), or other related components.

Figure 3:
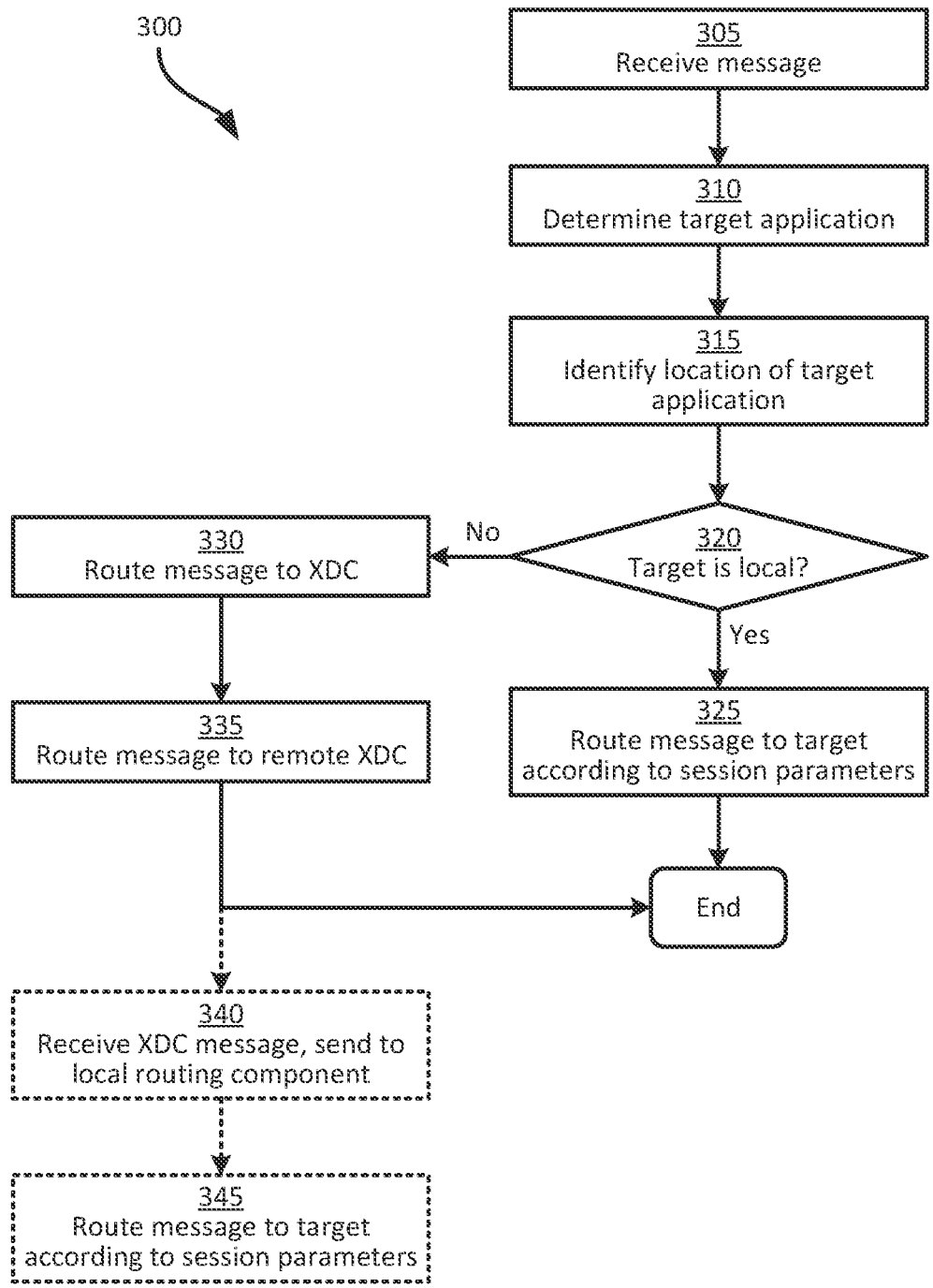
FIG. 3 is a flowchart of a method of controlling the generation of response data.

Turning to FIG. 3, the functionality of the system 100 will be described hi further detail. FIG. 3 illustrates a routing method 300 employed by the data centers 104, enabling requests and other tasks for the hosted applications to be relatively simply reallocated between data centers 104, with little or no reconfiguration of the hosted applications themselves. As noted in the discussion below, certain blocks of the method 300 are performed by the local routing component 128 of a given data center 104, while other blocks of the method 300 are performed by the XDC routing component 132.

At block 305, a data center 104, and in particular the local routing component 128 of the data center 104, is configured to receive a message for processing. The message can be received from an external computing device, such as the client device 136, or from a hosted application at the data center 104. For example, the hosted application may generate output data that is used as input data for another hosted application. The nature of the message depends on the functionality implemented by the host applications at the data centers 104, and may therefore vary widely.

At block 310, the local routing component 128 is configured to determine a target application for processing of the message. The determination at block 310 is not limited to the host applications at the data center 104 that received the message, but rather can include a determination that a host application at another data center 104 is the target application. The determination at block 310 is based on the content of the message. For example, the message can explicitly identify a hosted application in some examples, while in other examples the target application can be inferred by the local routing component 128 from the content of the message. In general, the target application is a hosted application configured to handle messages of the type received at block 305.

At block 310, the local routing component 128 can also generate communication session parameters, such as security parameters, a selection of a communications protocol used by the target application, and the like. The local routing component 128, in other words, is configured to perform additional actions at blocks 305 and 310, beyond simply responding to the request. Such actions include application identification and session management with the client device 136, and impose a degree of computational load on the computing subsystem 104-1 beyond that required to process the request to generate a response thereto.

At block 315, the local routing component 128 is configured to identify, according to the common routing matrix 224, the location of the target application determined at block 310. The location identified at block 315, specifically, is one of the data centers 104. The routing matrix 224 contains, for each hosted application in the system 100, an identifier of the data center 104 that hosts the current, active instance of that application. Table 1 is an example routing matrix, omitting the data center 104-3.

TABLE 1

| Example Routing Matrix 224 | |
|---|---|
| Application | Date Center |
| 106 | 104-1 |
| 108 | 104-1 |
| 110 | 104-1 |
| 112 | 104-1 |
| 114 | 104-2 |
| 116 | 104-2 |

Of note, the standby application instance 108' is not listed above, because it is not the active instance of the application 108. While the matrix 224 above identifies each hosted application individually, in other examples, hosted applications may be identified indirectly, e.g. by an application type and a client entity on whose behalf the data center 104 executes the application. An example of such a routing matrix 224 is shown below in Table 2.

TABLE 2

| Example Routing Matrix 224 | | |
|---|---|---|
| Application Type | Operator | Data Center |
| DCS | Airline A | 104-1 |
| DCS | Airline B | 104-1 |
| DCS | Airline C | 104-1 |
| DCS | Airline D | 104-2 |
| Reservations | [All] | 104-1 |
| Border Control | [All] | 104-2 |

In the example of Table 2, the rows correspond, respectively, to the hosted applications 106, 108, 110, 114, 112, and 116. In further examples, the matrix 224 can be maintained as distinct routing tables or other suitable data structures, e.g. one for each application type.

In further examples, the routing matrix 224 can also identify particular portions of the relevant data center 104. For example, rather than including simply a data center identifier as in Tables 1 and 2, the routing matrix 224 can include, for each hosted application, a data center identifier and a server identifier, corresponding to a particular computing device, or set of computing devices, at the relevant data center 104.

At block 315, therefore, the local routing component 128 is configured to retrieve, from the routing matrix 224, the identifier of the data center 104 that corresponds to the host application determined at block 310, whether by a specific application identifier, a combination of an application type and an operator identifier, or the like. The local routing component 128 can also, at block 315, reformat or otherwise transform the request to render the request compatible with the relevant hosted application. For example, the local routing component 128 can maintain or otherwise access formatting rules for each hosted application, in order to generate a modified version of the incoming request that is formatted according to the requirements of the hosted application that will handle the request.

Having identified which data center 104 hosts the target application at block 315, the local routing component 128 is configured to determine whether the target hosted application is local. That is, the local routing component 128 is configured to determine whether the target application is hosted at the same data center 104 as the local routing component 128 itself. When the determination at block 320 is affirmative, the local routing component 128 is configured to provide the message to the relevant hosted application, according to the session parameters mentioned earlier. In some examples, the generation of session parameters can occur following an affirmative determination at block 320, rather than at block 310 as mentioned above.

Figure 4:
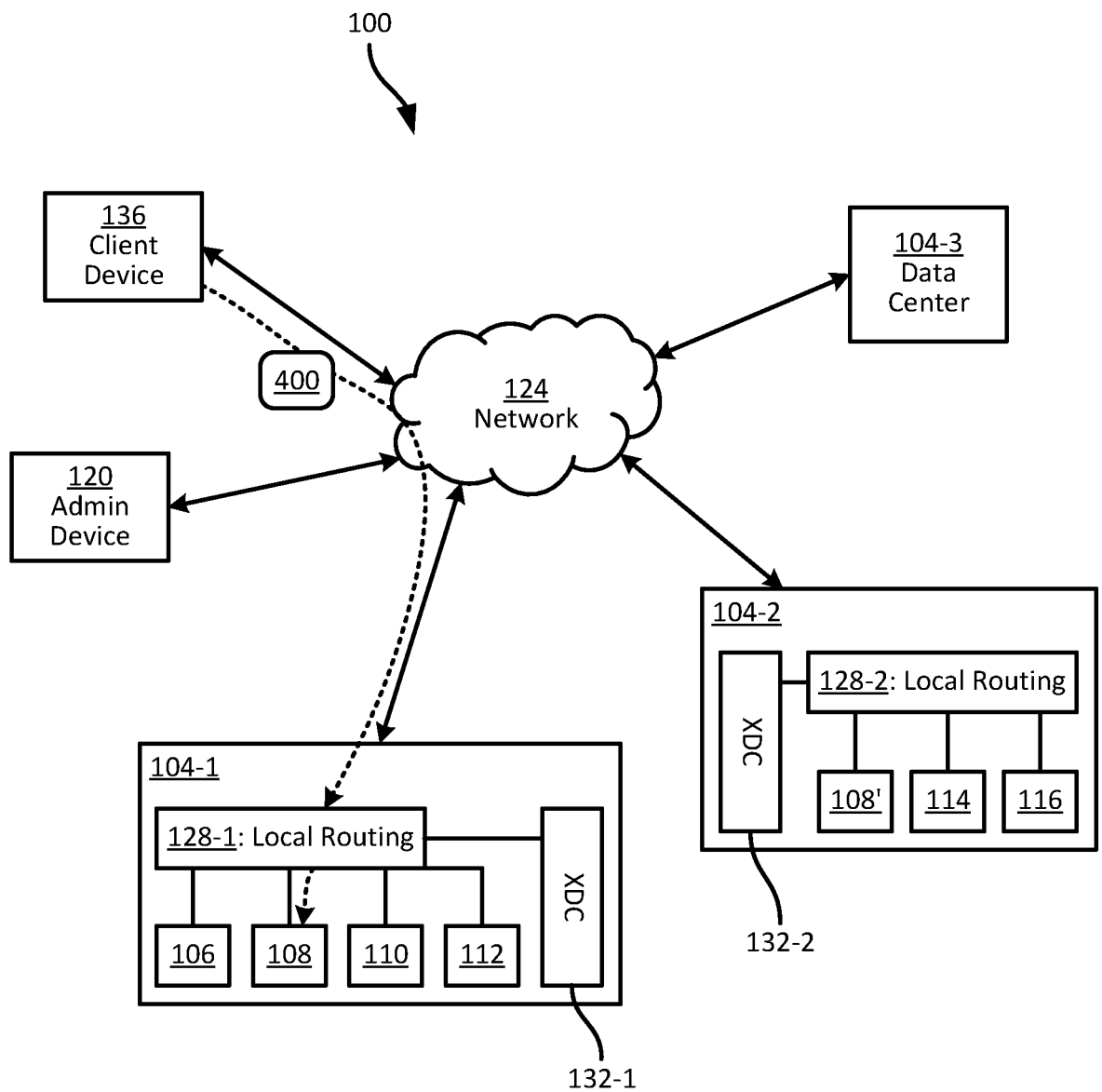
FIG. 4 is a diagram illustrating example performances of blocks 305-325 of the method of FIG. 3.

Turning to FIG. 4, an example performance of the method 300 is illustrated, in which a request 400 is received at the data center 104-1 from the client device 136. The local routing component 128-1 determines that the target application for handling the request 400 is the application 108. As a result, at block 315 the local routing component 128-1 identifies the data center 104-1 itself as the location of the target host application. The determination at block 320 is therefore affirmative, and at block 325, the message 400 is routed to the hosted application 108.

Another example performance of the method 300 will be described, at the data center 104-1, following a hardware failure associated with the hosted application 108. In response to the failure, the administrator device 120 may provide an updated routing matrix 224 to each of the data centers 104. Various mechanisms can be employed at the administrator device 120 to detect hardware failures and other performance problems at the data centers 104. In this example, the updated routing matrix 224 is generated at the administrator device 120 based on input data from an operator of the administrator device 120. For example, following detection of a failure associated with the hosted application 108, the routing matrix 224 can be edited to switch hosting for the application 108 to the data center 104-2, which hosts a standby instance 108' of the application 108.

Figure 5:
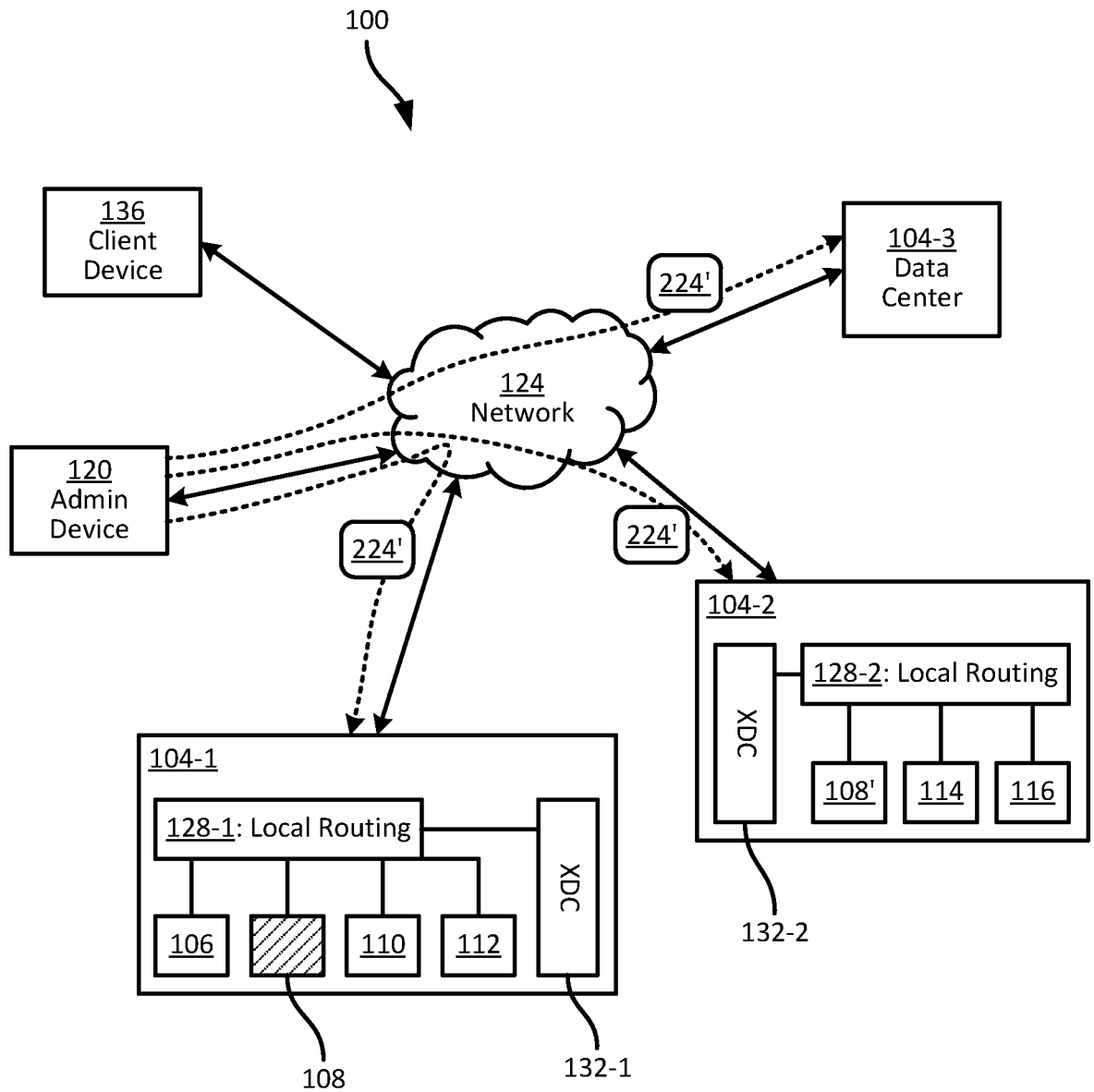
FIG. 5 is a diagram illustrating modification of a routing matrix employed in the system of FIG. 1.

As shown in FIG. 5, an updated routing matrix 224' is sent from the administrator device 120 to each of the data centers 104, where the routing matrix 224 is replaced with the updated routing matrix 224'. In some examples, the administrator device 120 need not send the entire routing matrix 224. Instead, the administrator device 120 can send a command to modify one or more specific records in the routing matrix 224. Table 3 illustrates the contents of the updated routing matrix 224. In particular, the DOS application for Airline B has been switched from the data center 104-1 (where the hosted application 108 has suffered performance degradation or failure) to the data center 104-2, where the standby instance 108' will become the active instance. In other examples, the routing matrix can also be updated to include an identification of the primary location for the relevant application, along with an indication that the primary location is currently unavailable.

TABLE 3

Example Routing Matrix 224'

| Application Type | Operator | Data Center |
|---|---|---|
| DCS | Airline A | 104-1 |
| DCS | Airline B | 104-2 |
| DCS | Airline C | 104-1 |
| DCS | Airline D | 104-2 |
| Reservations | [All] | 104-1 |
| Border Control | [All] | 104-2 |

Returning to FIG. 3, following receipt of a further request at block 305, e.g. from the client device 136, at block 310 the local routing component 128-1 determines that the target application is the hosted application 108, or alternatively, that the target application is the hosted DOS application for Airline B. At block 315, the local routing component 128-1 consults the updated routing matrix 224' and identifies the data center 104-2 as the location of the application 108. As will now be apparent, the determination at block 320 is therefore negative, because the application 108 is no longer local to the local routing component 128-1. Therefore, the performance of the method 300 proceeds to block 330 rather than block 325.

At block 330, the local routing component 128-1 is configured to route the message from block 305 to the XDC routing component 132-1, rather than to a hosted application at the data center 104. In particular, the message is provided to the XDC routing component 132-1 along with a routing indicator. The routing indicator enables the XDC component 132-1 to transmit the message to the appropriate one of the other data centers 104. The routing indicator therefore includes at least an identifier of the location of the target application determined at block 310. Therefore, the routing indicator can include an identifier of the data center 104-2 in this example. The routing indicator can also include an identifier of the target application, such as an identifier of a particular application server at the data center 104-2, an identifier of the application 108', or both.

At block 335, the XDC routing component 132-1 is configured to receive the message and the routing indicator from the local routing component 128-1, and to send at least the message to the data center 104 indicated by the routing indicator. That is, in this example, the XDC routing component 132-1 is configured to send the message to the XDC routing component 132-2 of the data center 104-2.

Messages transmitted between data centers 104 via the XDC routing components 132 can be transmitted according to a common inter-data center communications protocol, which may be distinct from the communication protocols that the hosted applications are configured to employ. Each local routing component 128 is configured to maintain at least one connection with each local hosted application, and may in fact maintain multiple connections with some hosted applications, e.g. if the hosted applications support more than one communication protocol. However, because the XDC routing components 132 are not required to communicate directly with hosted applications, the XDC components 132 can exchange data with one another using a single generic communications protocol.

Following transmission of the message (and optionally, some or all of the routing indicator) to the XDC routing component 132-2, the performance of the method 300 ends for the data center 104. At the data center 104-2, however, routing of the message to the target application 108' is completed by the XDC routing component 132-2 and the local routing component 128-2. In particular, at block 340 (illustrated in dashed lines to indicate the distinction between data centers 104-1 and 104-2), the XDC routing component 134-2 is configured to receive the message, and send the message to the local routing component 128-2, e.g. along with the routing indicator.

In response, at block 345, the local routing component 128-2 is configured to route the message to the target application (i.e. the hosted application 108', in this example), according to session parameters that can be generated at the local routing component 128-2 upon receipt of the message. Block 345, in other words, is analogous to block 325. As will be apparent, however, the local routing component 128-2 is relieved of the need to identify the relevant application, as well as reformat or otherwise transform the request 400, given that the local routing component 128-1 performed such adjustments at block 315. The local routing component 128-2 may also be responsible for a reduced, or eliminated, role in session management, given that at least some session parameters may be generated at the computing subsystem 104-1 and passed to the computing subsystem 104-2. In other words, the computational load associated with handling the request 400 at the computing subsystem 104-2 is reduced in comparison to the load at the computing subsystem 104-1 (or more generally, at the subsystem 104 that initially receives the request).

Figure 6:
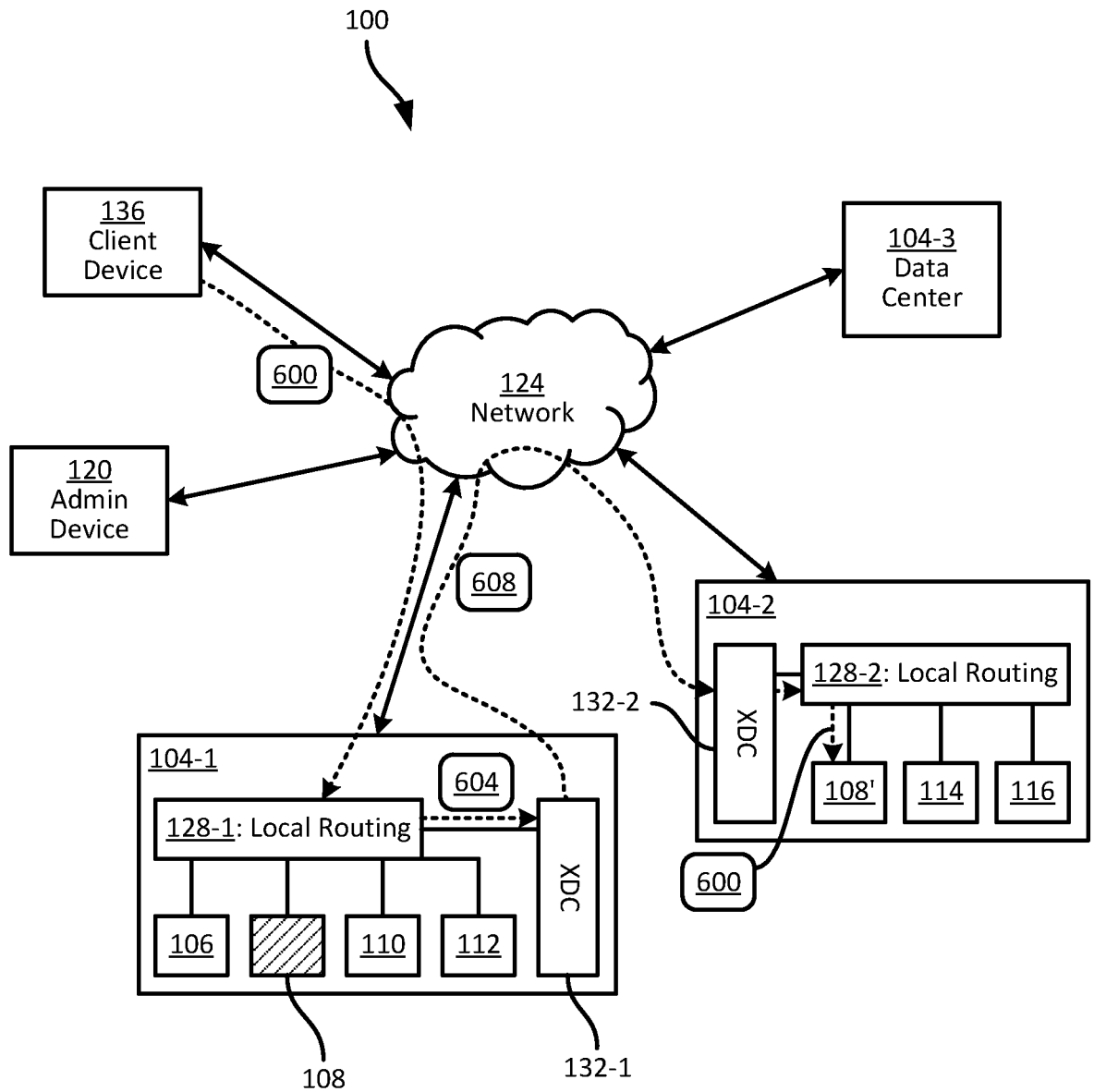
FIG. 6 is a diagram illustrating example performances of blocks 305-320, and 330-345, of the method of FIG. 3.

FIG. 6 illustrates the example performance of the method 300 discussed above. Specifically, the client device 136 sends a message (e.g. a request) 600 to the data center 104-1, where the message 600 is received at block 305. At block 310, the local routing component 128-1 determines that the target application is the hosted application 108', and as noted above, the routing matrix 224 indicates that the hosted application 108' is located at the data center 104-2. Therefore, at block 330, the local routing component 128-1 provides data 604 to the XDC routing component 132-1, containing the message 600 as well as the routing indicator (e.g. encapsulated in a wrapper according to the above-mentioned generic communications protocol). The XDC routing component 132-1, in turn, sends data 608 to the XDC routing component 132-2 via the persistently maintained communications link between the XDC routing component 132-1 and the XDC routing component 132-2. The data 608 includes at least the message 600, and can also include the routing indicator, or a part thereof (e.g. the application identifier, a server identifier, or both).

The XDC 132-2 receives the data 608 at block 340 and provides the data 608 to the local routing component 128-2. At block 345, the local routing component 128-2 provides the message 600 to the hosted application 108', e.g. using a communications protocol specific to the hosted application 108' (e.g. distinct from the protocol employed for communications between the XDC routing components 132).

As will now be apparent, the above message routing does not require reconfiguration of the application 108' itself, aside from setting the application 108' from a standby mode to an active mode. More generally, the hosted applications in the system 100 require little or no reconfiguration in response to changes in hosting location implemented via modifications to the routing matrix 224.

For example, if the hosted application 108' generates a further message, requiring processing by the hosted application 112, the fact that the hosted applications 108' and 112 are not located at the same data center 104, whereas the (now inactive) hosted application 108 was co-located with the hosted application 112, has no impact on the operation of either hosted application. Instead, the message generated by the hosted application 108' need only indicate, explicitly or implicitly, which application the message is intended for, and the local routing component 128-2 is configured to detect such an indication and route the message for processing as described above, whether such processing occurs locally or at another data center 104.

As will now be apparent, in examples where the message to be processed originates at the client device 136, the device 136 may receive a response from a data center 104 different than the data center to which the message was initially sent. Such a response can serve to redirect the client device 136 to the data center 104 that processed the initial message, in the event that further messages from the client device 136 are necessary. The data center that received the initial message is therefore relieved of the computational load of handling incoming messages for which it no longer hosts the active application (e.g. in the case of the applications 108 and 108').

Variations to the above are contemplated. For example, in some implementations, the routing matrix 224 can identify two or more locations for a given hosted application. In such examples, the routing matrix 224 can specify a portion (e.g. expressed as a percentage or other suitable parameter) of messages to be processed by each identified location. Table 4 illustrates an example routing matrix 224.

TABLE 4

Example Routing Matrix 224

| Application Type | Operator | Data Center | Portion |
| --- | --- | --- | --- |
| DCS | Airline A | 104-1 | 100% |
| DCS | Airline B | 104-1 | 60% |
| DCS | Airline B | 104-2 | 40% |
| DCS | Airline C | 104-1 | 100% |
| DCS | Airline D | 104-2 | 100% |
| Reservations | [All] | 104-1 | 100% |
| Border Control | [All] | 104-2 | 100% |

The routing matrix 224 of Table 4 shares much of its content with the routing matrix of Table 2. However, for Airline B, the routing matrix 224 specifies two distinct locations, in the form of both the data centers 104-1 and 104-2. The routing matrix 224 also includes a "portion" parameter for each record, indicating what portion of messages for a given application are to be routed to the corresponding location. In this example, the routing matrix 224 specifies that for messages handled by the application 108/108' (that is, the DOS application for Airline B), sixty percent are to be handled at the data center 104-1 (i.e. at the hosted application 108), and forty percent are to be handled at the data center 104-2 (i.e. at the hosted application 108'). A wide variety of other divisions between the data centers 104 can be specified in the routing matrix 224.

In the above example, the division of messages for the applications 108/108' between the data centers 104-1 and 104-2 can be accomplished via load balancing functionality at the local routing components 128. For example, the local routing components 128 can maintain a synchronized count of the total number of messages received at either data center 104 over a predefined time period (e.g. the previous hour, day, or the like). This enables each local routing component 128 to determine whether to handle a subsequent message for the applications 108/108' by processing the message locally or by routing the message for processing remotely (at the other data center 104).

In further implementations, modification of the routing matrix 224 can be performed automatically, rather than via commands from the administrator device 120. For example, a control component deployed at one or more of the data centers 104 can collect performance attributes of each hosted application at all data centers 104 in the system 100. The performance attributes can include CPU usage, message processing volume, error indicators, response times from the hosted applications, or the like. When such attributes satisfy a modification criterion (e.g. when CPU utilization for a given hosted application exceeds a threshold), the local routing component 128 can be configured to modify the routing matrix 224 to route messages to another instance of the relevant application. The other instance of the relevant application need not be hosted at another computing subsystem 104. In some examples, the other instance can be a second instance of the application hosted at the same computing subsystem 104. That is, the method 300 can be employed for intra-subsystem load balancing as well as inter-subsystem balancing.

The scope of the claims should not be limited by the embodiments set forth in the above examples, but should be given the broadest interpretation consistent with the description as a whole.

The invention claimed is:

1. A method in a system including a plurality of computing subsystems executing a set of hosted applications, the method comprising:
   at each of the computing subsystems, maintaining a copy of a common routing matrix defining, for each hosted application, an identifier of a computing subsystem configured to host the application;
   at a first one of the computing subsystems, executing (i) a first intra-subsystem routing application, and (ii) a first inter-subsystem routing application;
   via execution of the first intra-subsystem routing application:
      receiving a message from a client device external to the first computing subsystem;
      determining, based on content of the message, a target one of the hosted applications to process the message;
      identifying, according to the common routing matrix, a second one of the computing subsystems that executes the target hosted application;
      in response to the identifying, providing the message and a routing indicator to the first inter-subsystem routing application; and,
   at the first computing subsystem, via execution of the first inter-subsystem routing application:
      receiving the message and the routing indicator from the first intra-subsystem routing application; and
      transmitting the message to the second computing subsystem.

2. The method of claim 1, wherein receiving the message includes receiving the message from one of the hosted applications at the first computing subsystem.

3. The method of claim 2, wherein receiving the message includes receiving the message from one of the hosted applications at the second computing subsystem, via the first inter-subsystem routing application.

4. The method of claim 1, wherein transmitting the message includes transmitting the message to a second inter-subsystem routing application of the second computing subsystem.

5. The method of claim 4, wherein the transmitting includes: formatting the message according to an inter-subsystem communications protocol.

6. The method of claim 1, further comprising:
   maintaining, at the first inter-subsystem routing application, a communications link with each of a plurality of other inter-subsystem routing applications.

7. The method of claim 1, wherein the routing indicator includes an identifier of the second computing subsystem, and an identifier of the target hosted application.

8. The method of claim 7, wherein transmitting the message includes transmitting at least the identifier of the target hosted application.

9. The method of claim 1, further comprising:
   obtaining a command to modify the common routing matrix; and
   updating the common routing matrix.

10. The method of claim 9, wherein obtaining the command includes:
    at the first intra-subsystem routing application, determining that a performance attribute of an instance of a hosted application at the first computing subsystem meets a criterion;
    selecting an identifier of another computing subsystem executing another instance of the hosted application; and
    updating the common routing matrix to associate the hosted application with the other computing subsystem.

11. The method of claim 9, wherein obtaining the command includes receiving the command from an administrator computing device.

12. The method of claim 1, wherein the identifier in the routing matrix includes two or more identifiers corresponding to the hosted application.

13. A computing subsystem among a plurality of computing systems executing a set of hosted applications system, the computing subsystem comprising:
    a memory maintaining a copy of a common routing matrix defining, for each hosted application, an identifier of one of the plurality of computing subsystems configured to host the application;
    a communications interface; and
    a processor configured to execute a first intra-subsystem routing application, and (ii) a first inter-subsystem routing application;
    the processor configured, via execution of the first intra-subsystem routing application, to:
       receive a message from a client device external to the first computing subsystem,
       determine, based on content of the message, a target one of the hosted applications to process the message,
       identify, according to the common routing matrix, a second one of the computing subsystems that executes the target hosted application,
       in response to the identification, provide the message and a routing indicator to the first inter-subsystem routing application; and
    the processor further configured, via execution of the first inter-subsystem routing application, to:
       receive the message and the routing indicator from the first intra-subsystem routing application; and
       transmit the message to the second computing subsystem.

14. The computing subsystem of claim 13, wherein the processor is configured, via execution of the first intra-subsystem routing application, to receive the message from one of the hosted applications at the first computing subsystem.

15. The computing subsystem of claim 14, wherein the processor is configured, via execution of the first intra-subsystem routing application, to receive the message from one of the hosted applications at the second computing subsystem, via the first inter-subsystem routing component.

16. The computing subsystem of claim 13, wherein the processor is configured, via execution of the first inter-subsystem routing application, to transmit the message to a second inter-subsystem routing component of the second computing subsystem.

17. The computing subsystem of claim 16, wherein the processor is configured, via execution of the first inter-subsystem routing application, to: format the message according to an inter-subsystem communications protocol, prior to transmission of the message.

18. The computing subsystem of claim 13, wherein the processor is configured, via execution of the first inter-subsystem routing application, to maintain a communications link with each of a plurality of other inter-subsystem routing components.

19. The computing subsystem of claim 13, wherein the routing indicator includes an identifier of the second computing subsystem, and an identifier of the target hosted application.

20. The computing subsystem of claim 19, wherein the processor is configured, via execution of the first inter-subsystem routing application, to transmit, with the message, at least the identifier of the target hosted application.

21. The computing subsystem of claim 13, wherein the processor is configured, via execution of the first intra-subsystem routing application, to:
obtain a command to modify the common routing matrix; and
update the common routing matrix.

22. The computing subsystem of claim 21, wherein the processor is configured, via execution of the first intra-subsystem routing application, in order to obtain the command, to:
determine that a performance attribute of an instance of a hosted application at the first computing subsystem meets a criterion;
select an identifier of another computing subsystem executing another instance of the hosted application; and
update the common routing matrix to associate the hosted application with the other computing subsystem.

23. The computing subsystem of claim 21, wherein the processor is configured, via execution of the first intra-subsystem routing application, to receive the command from an administrator computing device.

24. The computing subsystem of claim 13, wherein the identifier in the routing matrix includes two or more identifiers corresponding to the hosted application.

* * * * *